United States Patent

Watanabe

[11] Patent Number: 6,040,795
[45] Date of Patent: *Mar. 21, 2000

[54] VEHICLE-MOUNTED RADAR APPARATUS

[75] Inventor: Masahiro Watanabe, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/008,546

[22] Filed: Jan. 16, 1998

[30] Foreign Application Priority Data

Jul. 15, 1997 [JP] Japan ................................ 9-189518

[51] Int. Cl.[7] .................................................. G01S 13/93
[52] U.S. Cl. ................................ 342/70; 342/80; 342/91
[58] Field of Search ............................. 342/70, 71, 72, 342/80, 85, 91

[56] References Cited

U.S. PATENT DOCUMENTS

| | | | |
|---|---|---|---|
| 5,023,617 | 6/1991 | Deering | 342/70 |
| 5,402,129 | 3/1995 | Gellner et al. | 342/70 |
| 5,652,589 | 7/1997 | Ono et al. | 342/70 |
| 5,694,130 | 12/1997 | Suzuki et al. | 342/70 |

FOREIGN PATENT DOCUMENTS 8-211145  8/1996  Japan .............................. G01S 13/60

OTHER PUBLICATIONS

Woll, JD., "Monopulse Doppler radar for vehicle applications", Proceedings of the Intelligent Vehicles '95. symposium, (Cat. No. 95TH8132) pp. 42–47, Published: New York, NY, USA, Sep. 1995.

Primary Examiner—Ian J. Lobo
Attorney, Agent, or Firm—Sughrue, Mion, Zinn, Macpeak & Seas, PLLC

[57] ABSTRACT

Data is acquired by transmitting radio waves or by receiving radio waves by means of a fixed beam provided in a vehicle-mounted radar apparatus, and an antenna unit is provided which has such an antenna gain that a straight line-of-sight distance with respect to each straight line-of-sight angle from a subject vehicle to a preceding vehicle traveling on a subject-vehicle lane is set as a maximum detection distance. Therefore, it is possible to detect a preceding vehicle traveling on a subject-vehicle lane from a subject vehicle, and not detect objects such as vehicles which are present in a longer distance than is necessary, thereby alleviating a burden on signal processing.

2 Claims, 9 Drawing Sheets

VEHICLE-MOUNTED RADAR APPARATUS

BACKGROUND OF THE INVENTION

The present invention relates to a vehicle-mounted radar apparatus.

A conventional vehicle-mounted radar apparatus, an apparatus as shown in FIG. 8 is known.

In the drawing, an antenna transmission/reception section 21 is comprised of an antenna unit 22, a coupler 23, a voltage controlled oscillator 24, a frequency conversion unit 25, and a gain control unit 26. Further, a signal processing section 27 is comprised of a modulated-signal control unit 28, a frequency analysis unit 29, and an arithmetic-operation control unit 30. Reference numeral 31 denotes a mechanical driving unit.

In the vehicle-mounted radar apparatus configured as described above, the modulated-signal control unit 28 supplies a modulation signal to the voltage controlled oscillator 24 to allow the voltage controlled oscillator 24 to generate relatively high frequency radio waves subjected to linear frequency modulation. Then, the relatively high frequency radio waves subjected to linear frequency modulation and outputted from the voltage controlled oscillator 24 are radiated to space from the antenna unit 22 via the coupler 23. Meanwhile, received radio waves from an object which reflects transmitted radio waves are received by the antenna unit 22 and are supplied to the frequency conversion unit 25.

In the frequency conversion unit 25, a part of the transmitted radio waves from the coupler 23 and the received radio waves from the antenna unit 22 are mixed, and a relatively low frequency signal is generated. An amount of transition of a frequency based on the time lag of radio waves corresponding to the distance to the object and an amount of transition of a Doppler frequency based on the moving velocity in a case where the object is moving are added to the frequency of the received radio waves. Accordingly, information such as the relative distance to the object and the relative velocity are multiplexed with the relatively low frequency signal generated by the frequency conversion unit 25. The power of this multiplexed signal is set by the gain control unit 25 in such a manner as to assume an appropriate magnitude for each scanning of the transmitted radio waves and the transmitted radio waves by the mechanical driving unit 31, and the arithmetic-operation control unit 30 computes the relative distance, the relative velocity, and the like with respect to the frequency data from the frequency analysis unit 29.

The above-described radar apparatus is used for a following-distance warning apparatus which informs the driver of a danger by issuing a warning when a distance with a vehicle ahead has become shorter than a safe following distance and the danger of a collision has become heightened, or for a following-distance controlling apparatus for effecting follow-up traveling by keeping a safe following distance with a vehicle ahead.

Further, a technique for improving the distance resolution by changing a modulation period and a technique for facilitating pairing when an identical target is determined are disclosed in publications which are cited below as conventional techniques.

Namely, Unexamined Japanese Patent Publication 8-136647 discloses a technique in which the normalized value of (distance value/beat frequency) is made small by making a modulation period short, so as to improve the distance resolution.

In addition, Unexamined Japanese Patent Publication 8-189965 discloses a technique in which a modulation period is made long during high-speed traveling to widen the range of a detection distance, and the modulation period is made short during close-distance detection to restrict the detection range to the close distance, thereby improving the distance resolution.

Further, Unexamined Japanese Patent Publication 8-211145 discloses a technique in which if the modulation period is made large, the velocity resolution declines, but the difference in amplitude between reflected signals from a target which are obtained during a rise and a fall in frequency modulation becomes small, so that when an identical target is determined, pairing is facilitated by combining the same amplitudes.

Next, referring to FIG. 9, a description will be given of a method of determining a straight line-of-sight angle and a straight line-of-sight distance from a subject vehicle to a preceding vehicle traveling on the same lane as that of the subject vehicle when the subject vehicle is traveling on a monotonous curved road in a general road environment. FIG. 9 is an explanatory diagram illustrating one example for computing the straight line-of-sight angle and the straight line-of-sight distance.

In FIG. 9, the meanings of the respective symbols are as follows.

| | |
|---|---|
| θ [unit: °]: | straight line-of-sight angle from the subject vehicle to the preceding vehicle traveling on the subject-vehicle lane |
| R [unit: m]: | straight line-of-sight distance from the subject vehicle to the preceding vehicle traveling on the subject-vehicle lane |
| r [unit: m]: | radius of the curve of a highway (defined at the center of a lane) |
| W [unit: m]: | lane width (in Japan, W = 3.5 m) |
| t [unit: m]: | distance of deviation from the center of the lane during traveling of the subject vehicle, and it is assumed that the subject vehicle travels within ±t [unit: m] from the center of the lane |
| s [unit: m]: | distance of deviation from the center of the lane during traveling of the preceding vehicle, and it is assumed that the preceding vehicle travels within ±s [unit: m] from the center of the lane |

The following formulae can be obtained by geometrically analyzing FIG. 9.

$$\theta(r, \pm t) = (180/\pi) \times \cos^{-1}\{(r - W/2)/(r \pm t)\} \quad [\text{unit: } °] \quad (1)$$

$$R(r, \pm t, \pm s) = (r \pm t) \times \sin[\cos^{-1}\{(r - W/2)/(r \pm t)\}] + \quad (2)$$
$$(r \pm s) \times \sin[\cos^{-1}\{(r - W/2)/(r \pm s)\}]$$
$$[\text{unit: } °]$$

or, $$R(r, \pm t, \pm s) = (r \pm t) \times \sin\{(p/180) \times q(r, \pm t)\} + \quad (3)$$
$$(r \pm s) \times \sin\{(p/180) \times q(r, \pm t)\}$$
$$[\text{unit: } °]$$

If the straight line-of-sight angle θ and the straight line-of-sight distance R with respect to a number of specific radii r of the curve (defined at the center of the lane) of a monotonous curved road are determined in accordance with Formulae (1) to (3), we have Example 1. in the case of r=319 [unit: m]

$$\theta(319, \pm 0) \approx 6[\text{unit}: °], R(319, \pm 0, \pm 0) \approx 67[\text{unit}: m] \quad (4)$$

Example 2. in the case of r=460 [unit: m]

$$\theta(460, \pm 0) \approx 5[\text{unit}: °], R(460, \pm 0, \pm 0) \approx 80[\text{unit}: m] \quad (5)$$

Example 3. in the case of r=718[unit: m]

$$\theta(718, \pm 0) \approx 4[\text{unit}: °], R(718, \pm 0, \pm 0) \approx 100[\text{unit}: m] \quad (5)$$

Example 4. in the case of r=1277[unit: m]

$$\theta(1277, \pm 0) \approx 3[\text{unit}: °], R(1277, \pm 0, \pm 0) \approx 134[\text{unit}: m] \quad (7)$$

Example 5. in the case of r=2872[unit: m]

$$\theta(2872, \pm 0) \approx 2[\text{unit}: °], R(2872, \pm 0, \pm 0) \approx 200[\text{unit}: m] \quad (8)$$

In a general road environment, it is considered that 160 m or thereabouts is required as the distance for detecting the preceding vehicle traveling on the subject vehicle lane from the subject vehicle.

However, in the case of monotonous curved roads, there are cases where the straight line-of-sight distance from the subject vehicle to the preceding vehicle traveling on the subject-vehicle lane is substantially shorter than 160 m, as shown in the results of Formulae (4) to (8) above.

Since the conventional vehicle-mounted radar apparatus is configured as described above, with respect to the direction of the straight line-of-sight angle from the subject vehicle to the preceding vehicle traveling on the subject-vehicle lane on a monotonous curved road, the detection distance becomes longer than is necessary, so that the subject vehicle receives radio waves received from a multiplicity of unnecessary objects such as vehicles.

SUMMARY OF THE INVENTION

The present invention has been accomplished to overcome the above-described problems, and its object is to provide a vehicle-mounted radar apparatus which is capable of detecting a preceding vehicle traveling on the subject-vehicle lane from the subject vehicle on a straight road and a monotonous curved road, and which does not detect objects such as vehicles which are present in a longer distance than is necessary, thereby making it possible to alleviate the burden on signal processing.

The vehicle-mounted radar apparatus in accordance with the present invention acquires data by transmitting radio waves or receiving radio waves in space by means of a fixed beam, and is provided with an antenna unit having such an antenna gain that a straight line-of-sight distance with respect to each straight line-of-sight angle from a subject vehicle to a preceding vehicle traveling on a subject-vehicle lane is set as a maximum detection distance.

Further, in the vehicle-mounted radar apparatus in accordance with the present invention, a monopulse-type antenna unit is used as said antenna unit.

DETAILED DESCRIPTION OF THE PREFERRED EMBODIMENTS

First Embodiment

Figure 1:
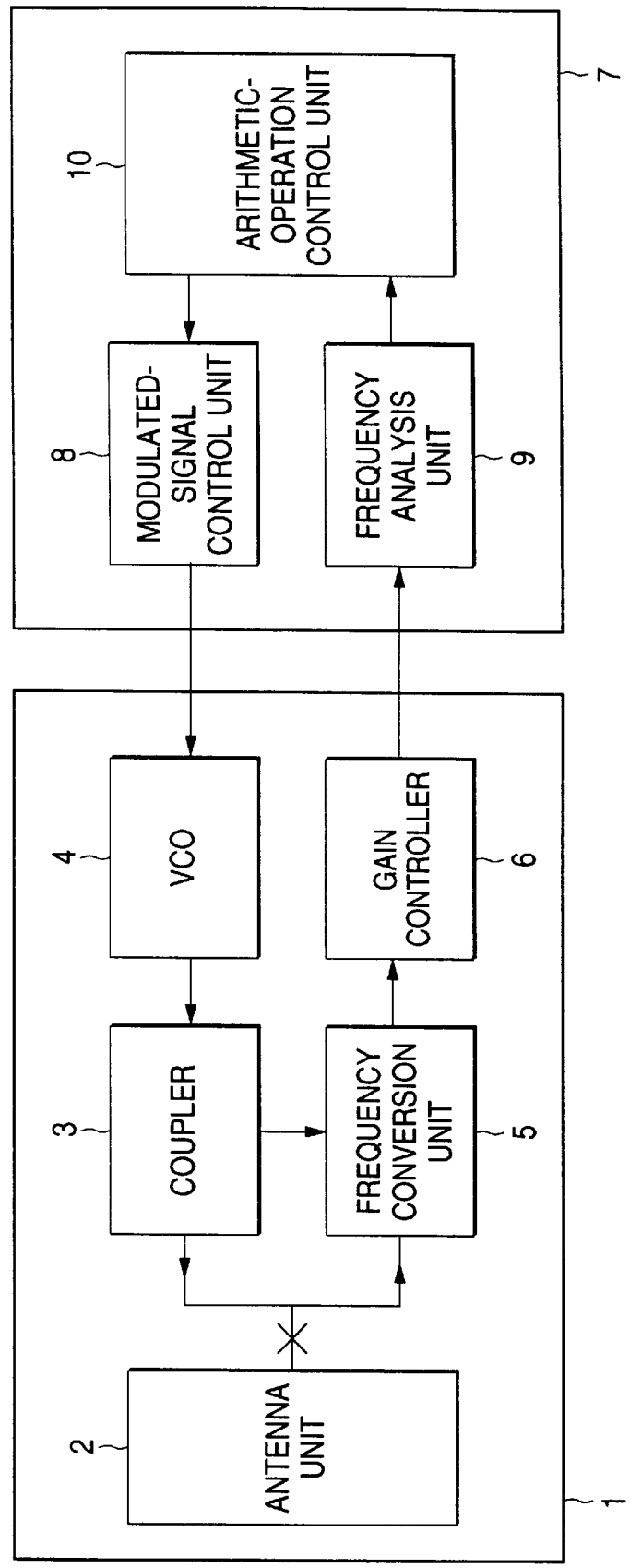
FIG. 1 is a schematic diagram illustrating a vehicle-mounted radar apparatus in accordance with a first embodiment of the present invention.

FIG. 1 is a schematic diagram illustrating a vehicle-mounted radar apparatus in accordance with an embodiment of the present invention. In the drawing, an antenna transmission/reception section 1 is comprised of an antenna unit 2, a coupler 3, a voltage controlled oscillator 4, a frequency conversion unit 5, and a gain control unit 6. Further, a signal processing section 7 is comprised of a modulated-signal control unit 8, a frequency analysis unit 9, and an arithmetic-operation control unit 10.

In accordance with the present invention, by using a fixed beam, the conventionally used mechanical driving unit is eliminated, and scanning is thereby not performed. As a result, it becomes not to detect far-distance objects, so that it becomes possible to avoid detection of unnecessary objects. Incidentally, the width of the beam is wider than in the conventional system, and it is possible to effect detection in a wide range in the transverse direction even without scanning.

Next, a description will be given of the operation.

The modulated-signal control unit 8 supplies a modulation signal to the voltage controlled oscillator 4 to allow the voltage controlled oscillator 4 to generate relatively high frequency radio waves subjected to linear frequency modulation. The relatively high frequency radio waves subjected to linear frequency modulation and outputted from the voltage controlled oscillator 4 are radiated to space from the antenna unit 2 via the coupler 3. Meanwhile, received radio waves from an object which reflects transmitted radio waves are received by the antenna unit 2 and are supplied to the frequency conversion unit 5. In the frequency conversion unit 5, part of the transmitted radio waves from the coupler 3 and the received radio waves from the antenna unit 2 are mixed, and a relatively low frequency signal is generated.

An amount of transition of a frequency based on the time lag of radio waves corresponding to the distance to the object and an amount of transition of a Doppler frequency based on the moving velocity in a case where the object is moving are added to the frequency of the received radio waves. Accordingly, information such as the relative distance to the object and the relative velocity are multiplexed with the relatively low frequency signal from the frequency conversion unit 5. The power of this multiplexed signal is set by the gain control unit 6 in such a manner as to assume an appropriate magnitude, and the arithmetic-operation control unit 10 computes the relative distance, the relative velocity, and the like with respect to the frequency data from the frequency analysis unit 9.

Next, a description will be given of a method of computing the relative distance and the relative velocity.

Figure 2:
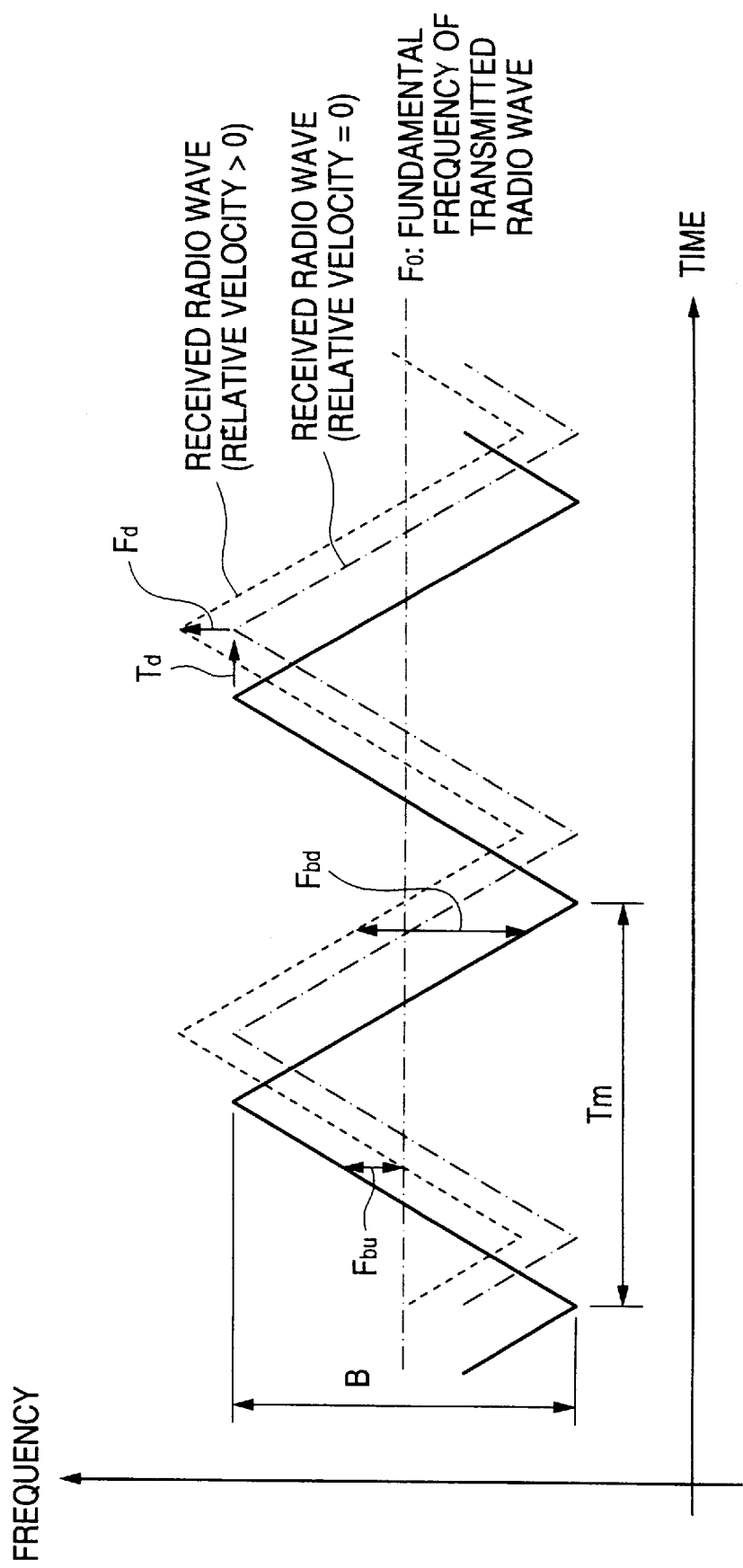
FIG. 2 is an explanatory diagram illustrating a method of computing the relative distance and the relative velocity by the vehicle-mounted radar apparatus.

FIGS. 2 shows one example of computing the relative distance and the relative velocity by using the above-described radar apparatus.

In the drawing, the meanings of the symbols are as follows.

C: light velocity=$3.0 \times 10^8$ m/s $\lambda$: wavelength of a transmitted radio wave As an example, if a fundamental frequency $F_0$ of the transmitted radio wave=60 GHz, then $\lambda = 5.0 \times 10^{-3}$ m.

B: frequency sweep bandwidth

Time delay Td with respect to the relative distance R:

Td=2R/C

Doppler frequency Fd with respect to the relative velocity V:

Fd=$2V/\lambda$

Fbu: frequency difference between a transmitted signal and a received signal during a frequency rise Fbd: frequency difference between a transmitted signal and a received signal during a frequency drop Accordingly, the relative distance R in a case where an object which reflects the radio wave has no relative velocity is represented as following equation.

$$Fbu = Fbd = (B/(Tm/2)) \cdot (2R/C) = 4 \cdot B \cdot R / Tm \cdot C$$

Therefore, $$R = (Tm \cdot C / 4 \cdot B) \cdot Fbu (=Fbd) \quad (9)$$

In addition, the relative distance and the relative velocity in a case where an object which reflects the radio wave has a relative velocity is represented as follow.

$$Fbu = (B/(Tm/2)) \cdot (2R/C) - 2V/\lambda$$
$$= 4 \cdot B \cdot R / Tm \cdot C - 2V/\lambda, \text{ and}$$
$$Fbd = (B/(Tm/2)) \cdot (2R/C) + 2V/\lambda$$
$$= 4 \cdot B \cdot R / Tm \cdot C + 2V/\lambda$$

Therefore, $$R = (Tm \cdot C / 8B) \cdot (Fbu + Fbd) \quad (10)$$

$$V = (\lambda/4) \cdot (Fbu - Fbd) \quad (11)$$

As for the resolutions of the relative distance and the relative velocity, if it is assumed that the frequency resolution $\Delta F$ (=$1/(Tm/2)$) is equal to $4 \cdot B \cdot R/Tm \cdot C$ or $2V/\lambda$, and that the distance resolution is 1R and the velocity resolution is $\lambda V$, since $\Delta F$ (=$1/(Tm/2)$)=$4 \cdot B \cdot \Delta R/Tm \cdot C$, $$\Delta R = C/(2 \cdot B) \quad (12)$$

since $\Delta F$ (=$1/(Tm/2)$)=$2 \Delta V/\lambda$, $$\Delta V = \lambda/TM \quad (13)$$

Accordingly, for example, since $$B = C/(2 \cdot \Delta R) = 3.0 \times 10^8 / (2 \times 0.5) = 3.0 \times 10^8,$$

in order to obtain $\Delta R = 0.5$ m, it suffices if B=300 MHz.

In addition, since $$Tm = \lambda/\Delta V = 5.0 \times 10^{-3}/(1 \times 3.6) = 18 \times 10^{-3},$$

in order to obtain $\Delta V = 1$ km/h, it suffices if Tm=18 sec.

In addition, in a radar apparatus, the radar equation shown in the following formula generally holds:

$$R0^4 = R1^4 \times 10^{(0.2) \alpha \cdot R1} = \{Pt \cdot Gt \cdot Gr \cdot \lambda^2 \cdot \sigma\}/\{(4\pi)^3 \cdot Smin \cdot (S/N) \cdot L_{SYS} \cdot L_{AGC}\} \quad (14)$$

In Formula (14), R0 is an ideal maximum detection distance when the atmospheric attenuation rate is not taken into consideration; R1 is an actual maximum detection distance; $\alpha$ is an atmospheric attenuation rate; Pt is the transmission power; Gt is the gain of a transmitting antenna; Gr is the gain of a receiving antenna; $\lambda$ is the wavelength of transmitted radio waves; $\sigma$ is an effective reflecting area of an object; Smin is the minimum reception sensitivity; S/N is a detection coefficient; $L_{SYS}$ is a system loss; and $L_{AGC}$ is an amount of attenuation provided in a gain control unit. In addition, in the case of a jointly used transmitting/receiving antenna, Gt=Gr.

In the above-described vehicle-mounted radar apparatus, in a case where the relative distance and the relative velocity are computed, as for the frequencies of Fbu and Fbd generated during the section of a frequency rise and the section of a frequency drop in a frequency modulation period, correct values can be obtained from the combination of frequencies from the same object. However, if frequencies of Fbu and Fbd from a multiplicity of objects are present, the operation of finding a correct combination of frequencies from the same object is required, so that the burden on signal processing becomes large.

Accordingly, in the present invention, the burden on signal processing is alleviated by making use of the fact that the maximum detection distance R1 changes by the antenna gains Gt and Gr in the radar equation shown in Formula (14).

Namely, by using as reference the maximum detection distance necessary for straight roads as well as the results shown in Formulae (4) to (8), the antenna gains Gt and Gr are set with respect to each straight line-of-sight angle q such that each straight line-of-sight distance R at the straight line-of-sight angle $\theta$ from the subject vehicle to the preceding vehicle traveling on the subject-vehicle lane becomes the maximum detection distance R1 of the present vehicle-mounted radar apparatus. As a result, it becomes possible to detect the preceding vehicle traveling on the subject-vehicle lane from the subject vehicle on a straight road and a monotonous curved road, and it becomes relatively possible not to detect objects such as vehicles which are present in a longer distance than is necessary.

Figure 3:
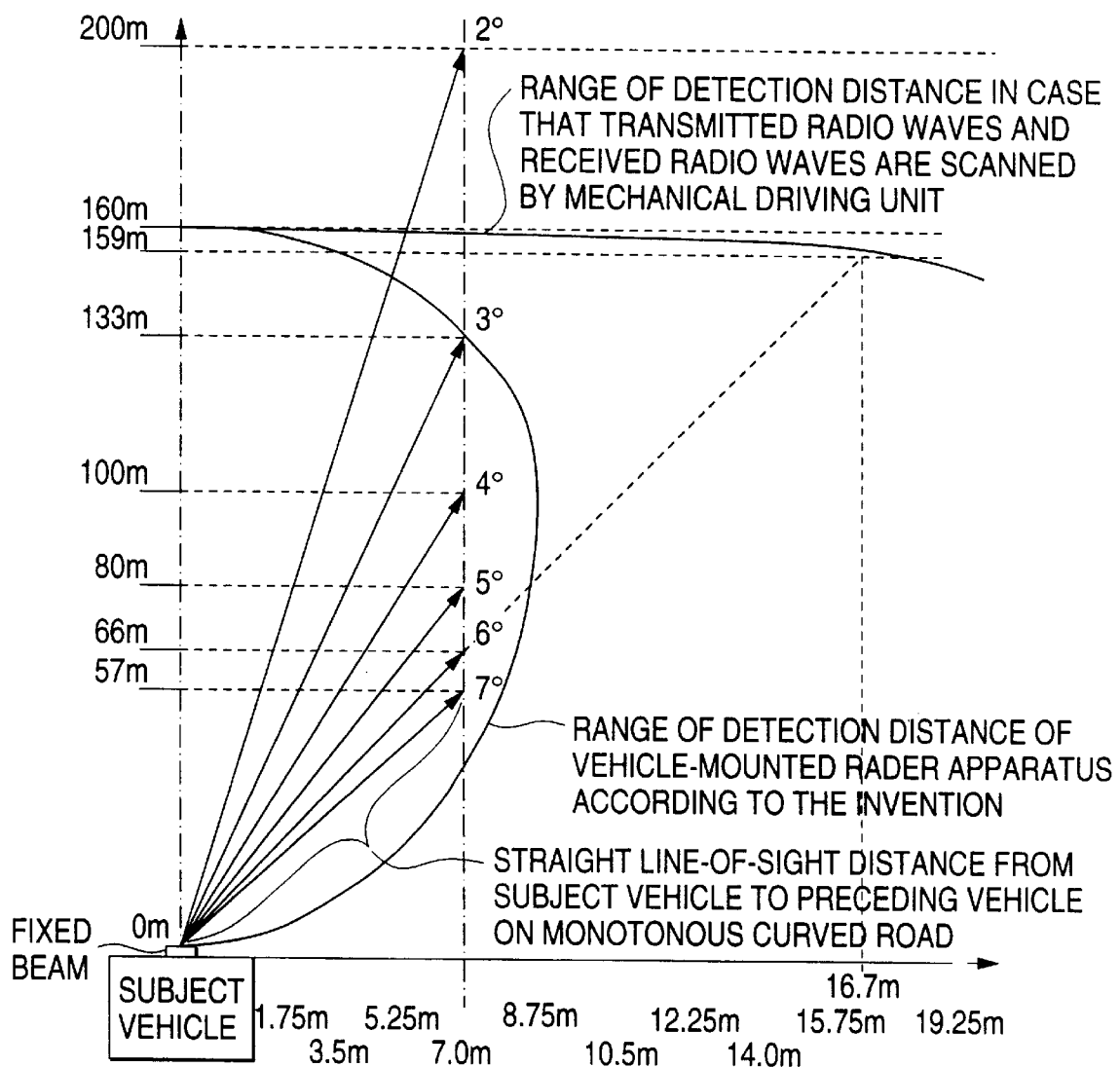
FIG. 3 is a diagram illustrating a detection range of the vehicle-mounted radar apparatus in accordance with the first embodiment of the present invention.

FIG. 3 shows the maximum detection distance of the vehicle-mounted radar apparatus in accordance with the present invention with respect to each straight line-of-sight angle $\theta$.

As described above, according to the vehicle-mounted radar apparatus in accordance with the present invention, it becomes possible to detect the preceding vehicle traveling on the subject-vehicle lane from the subject vehicle on a straight road and a monotonous curved road, and it becomes relatively possible not to detect objects such as vehicles which are present in a longer distance than is necessary. Accordingly, as for the frequencies of Fbu and Fbd generated during the section of a frequency rise and the section of a frequency drop in a frequency modulation period, those frequencies which are transmitted from objects located at a longer distance than is necessary are relatively few, so that it becomes easy to find a correct combination of the frequencies of Fbu and Fbd from the same object, thereby making it possible to substantially mitigate the burden on signal processing.

Second Embodiment

Figure 4:
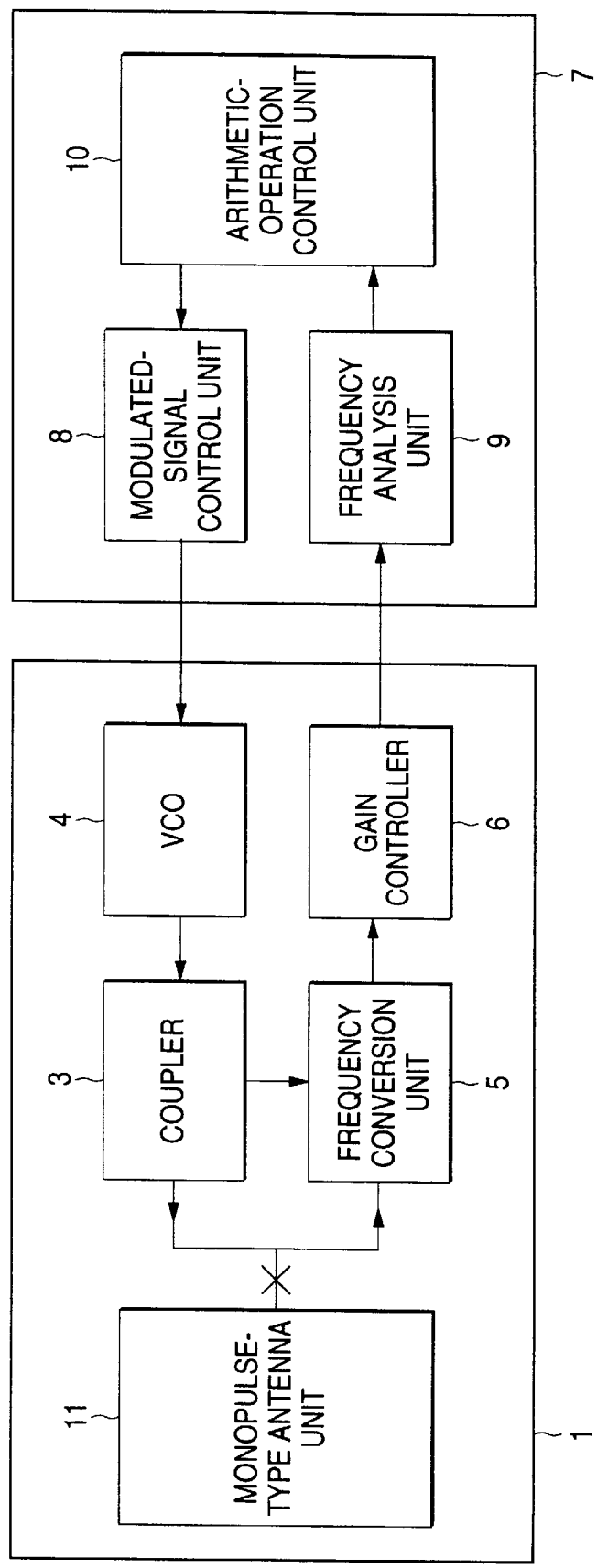
FIG. 4 is a schematic diagram illustrating the vehicle-mounted radar apparatus in accordance with a second embodiment of the present invention.

FIG. 4 is a schematic diagram illustrating a vehicle-mounted radar apparatus in accordance with a second embodiment of the present invention. In the drawing, the antenna transmission/reception section 1 is comprised of a monopulse-type antenna unit 11, the coupler 3, the voltage controlled oscillator 4, the frequency conversion unit 5, and the gain control unit 6. Further, the signal processing section 7 is comprised of the modulated-signal control unit 8, the frequency analysis unit 9, and the arithmetic-operation control unit 10.

In the above-described vehicle-mounted radar apparatus, the modulated-signal control unit 8 supplies a modulation signal to the voltage controlled oscillator 4 to allow the voltage controlled oscillator 4 to generate relatively high frequency radio waves subjected to linear frequency modulation. The relatively high frequency radio waves subjected to linear frequency modulation and outputted from the voltage controlled oscillator 4 are radiated to space from the monopulse-type antenna unit 11 via the coupler 3. Meanwhile, received radio waves from an object which reflects transmitted radio waves are received by the monopulse-type antenna unit 11 and are supplied to the frequency conversion unit 5.

In the frequency conversion unit 5, part of the transmitted radio waves from the coupler 3 and the received radio waves from the monopulse-type antenna unit 11 are mixed, and a relatively low frequency signal is generated. Added to the frequency of the received radio waves are an amount of transition of a frequency based on the time lag of radio waves corresponding to the distance to the object, an amount of transition of a Doppler frequency based on the moving velocity in a case where the object is moving, and information on the straight line-of-sight angle, obtained by the monopulse-type antenna unit 11, from the subject vehicle to the preceding vehicle traveling on the subject-vehicle lane. Accordingly, information on the relative distance to the object, the relative velocity, and the angle is multiplexed with the relatively low frequency signal from the frequency conversion unit 5. The power of this multiplexed signal is set by the gain control unit 6 in such a manner as to assume an appropriate magnitude, and the arithmetic-operation control unit 10 computes the relative distance, the relative velocity, and the angle with respect to data from the frequency analysis unit 9 such as the frequency, power, phase, and the like.

Here, in the same way as in the above-described first embodiment, the burden on signal processing is alleviated by making use of the fact that the maximum detection distance R1 changes by the antenna gains Gt and Gr in the radar equation shown in Formula (14).

Namely, by using as reference the maximum detection distance necessary for straight roads as well as the results shown in Formulae (4) to (8), the antenna gains Gt and Gr are set with respect to each straight line-of-sight angle q such that each straight line-of-sight distance R at the straight line-of-sight angle θ from the subject vehicle to the preceding vehicle traveling on the subject-vehicle lane becomes the maximum detection distance R1 of the present vehicle-mounted radar apparatus. As a result, it becomes possible to detect the preceding vehicle traveling on the subject-vehicle lane from the subject vehicle on a straight road and a monotonous curved road, and it becomes relatively possible not to detect objects such as vehicles which are present in a longer distance than is necessary.

In this embodiment, the arrangement provided is such that angle information is further obtained by the monopulse-type antenna unit 11.

Here, a description will be given hereafter of a method of measuring the angle by the monopulse-type antenna unit 11.

Figure 5:
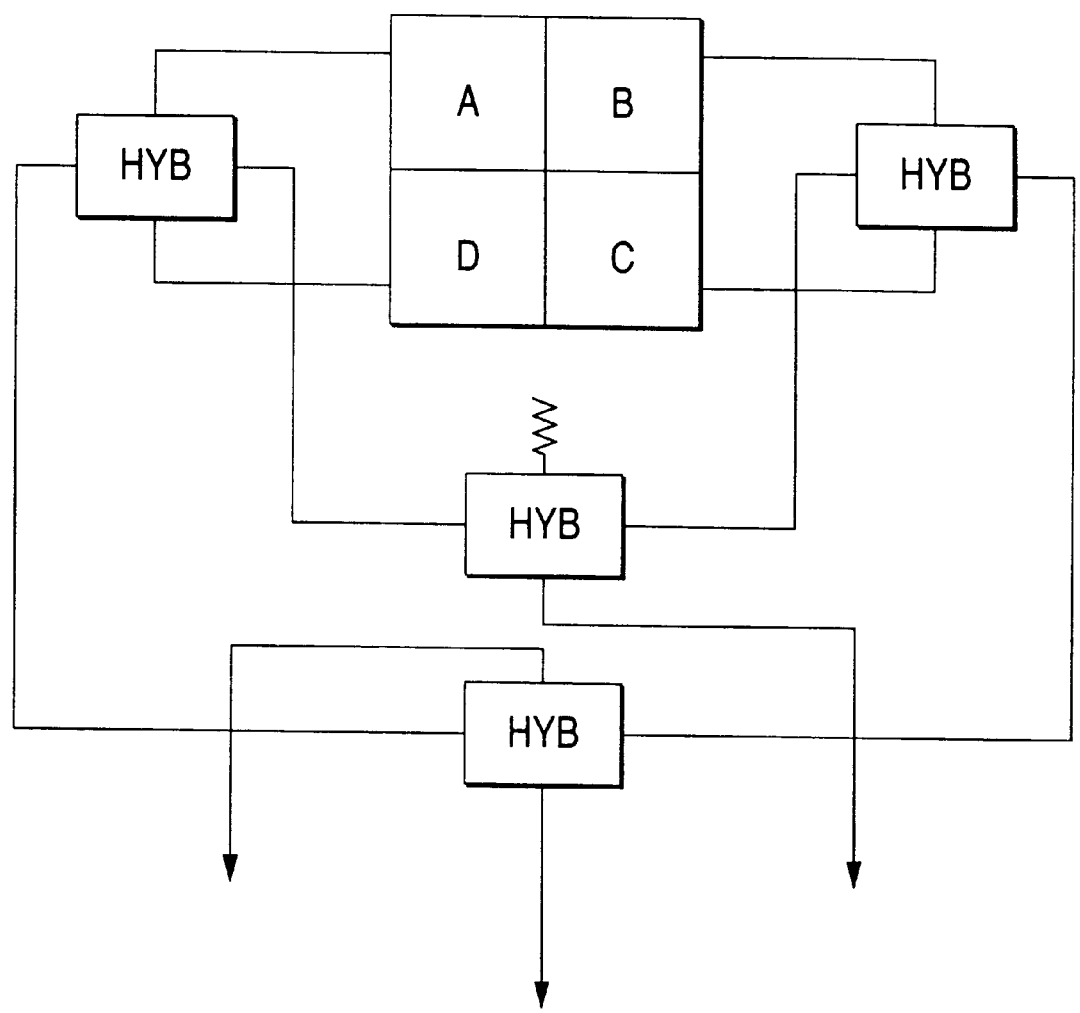
FIG. 5 is a schematic diagram of a monopulse-type antenna unit.
Figure 6A:
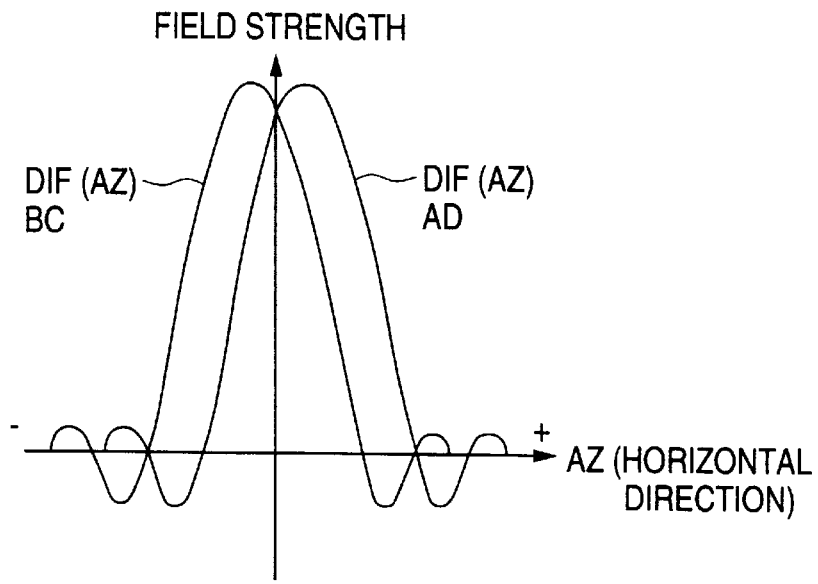
FIGS. 6A and 6B are graphs illustrating the operating principle of the monopulse-type antenna unit.
Figure 6B:
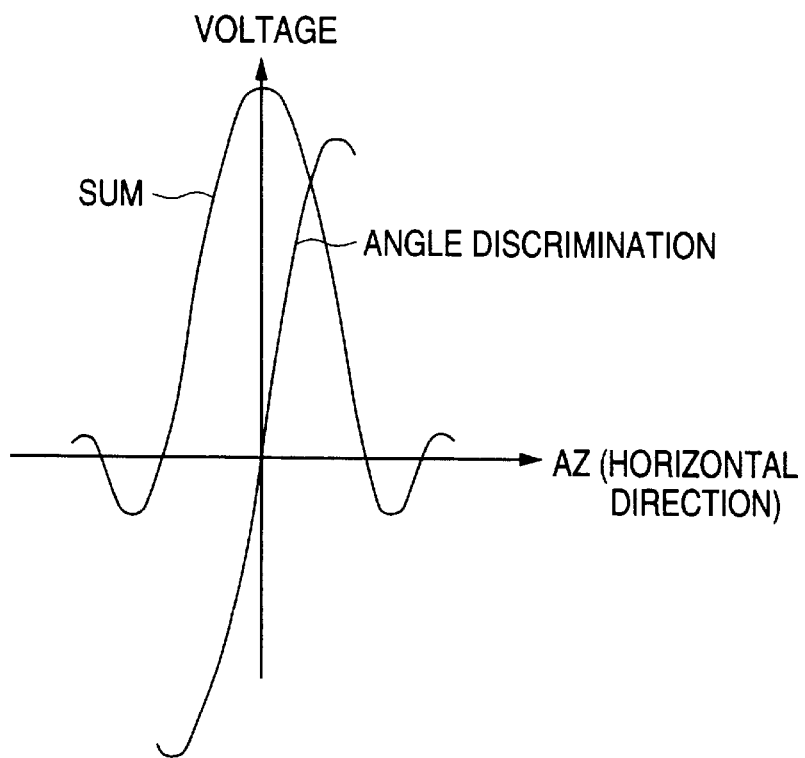
Figure 7A:
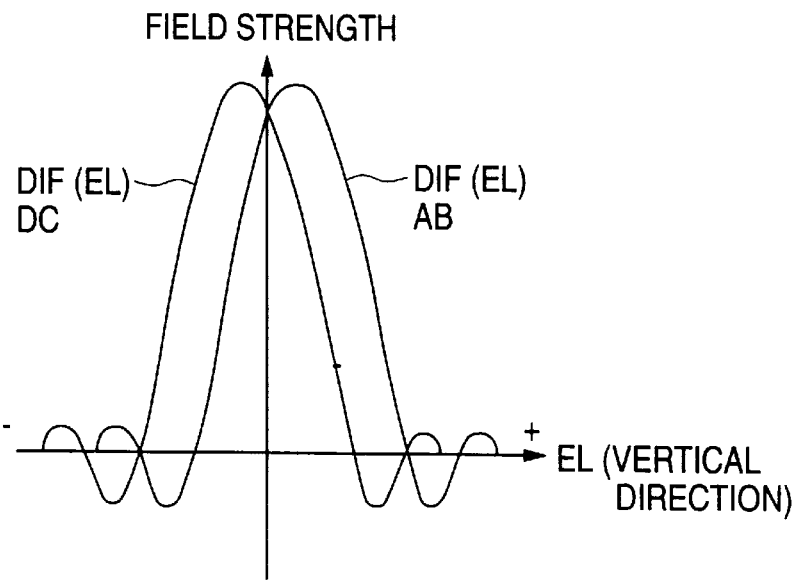
FIGS. 7A and 7B are graphs illustrating the operating principle of the monopulse-type antenna unit.
Figure 7B:
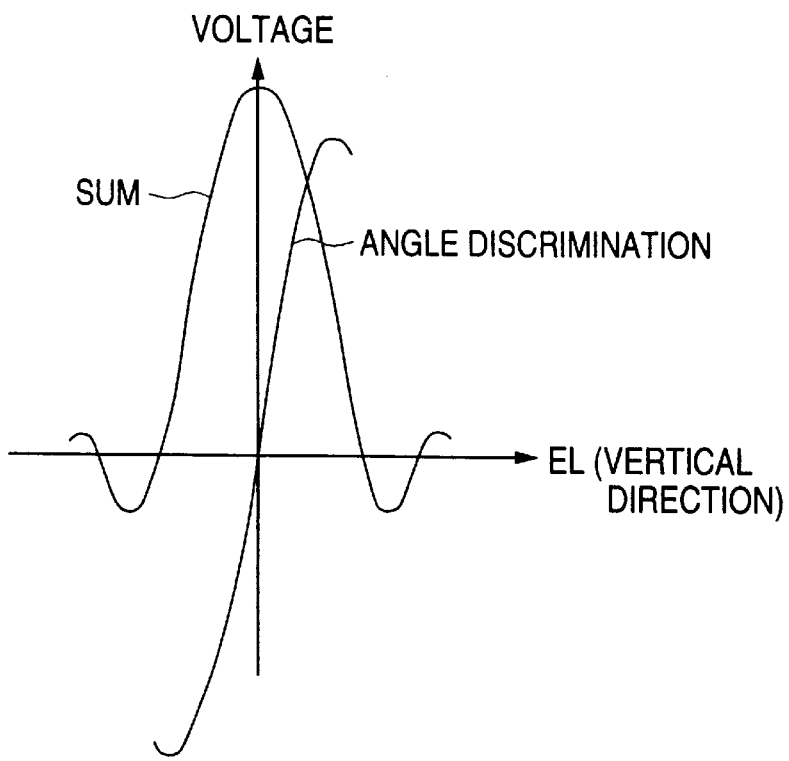
Figure 8:
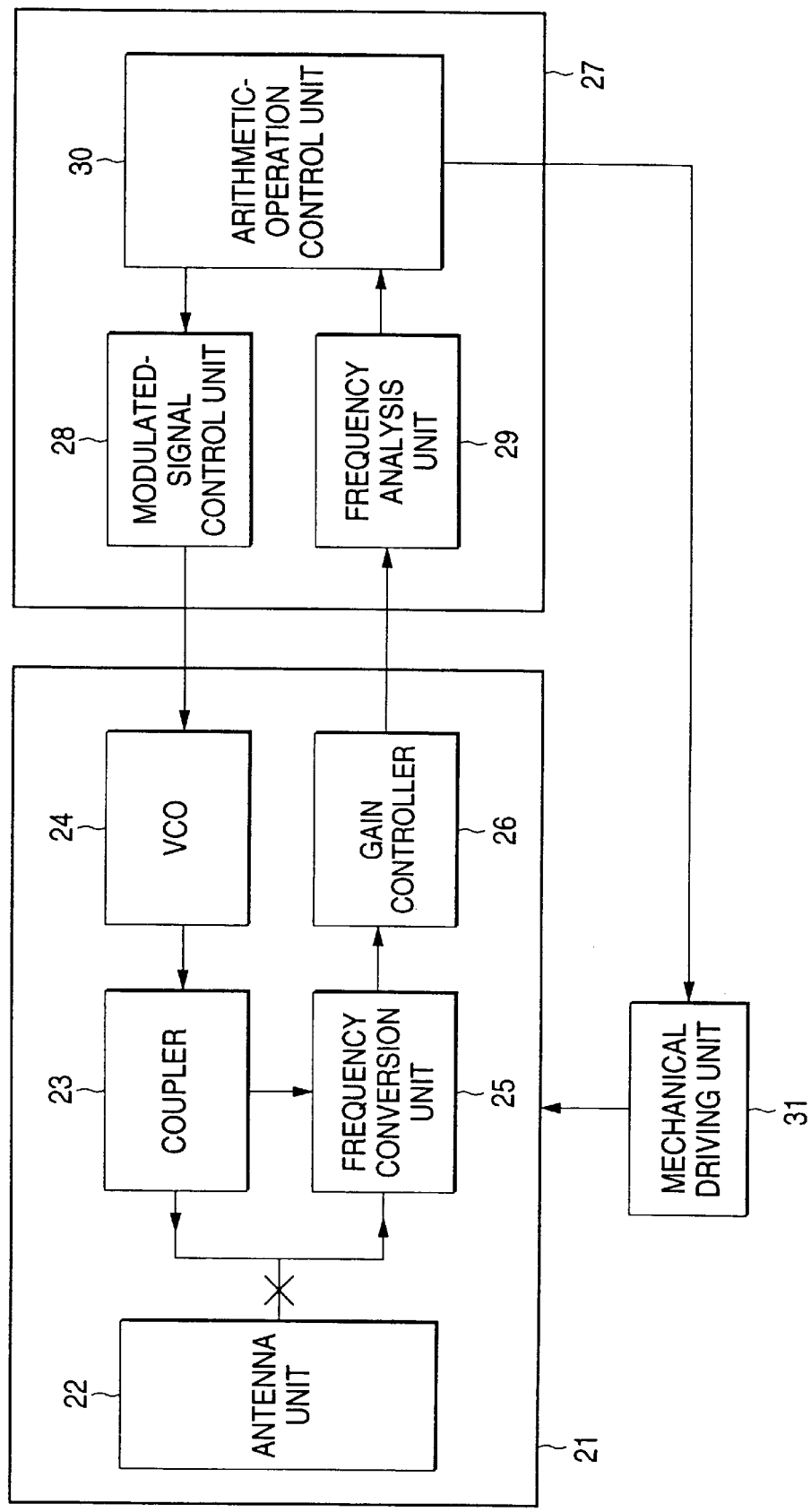
FIG. 8 is a schematic diagram illustrating a conventional vehicle-mounted radar apparatus.
Figure 9:
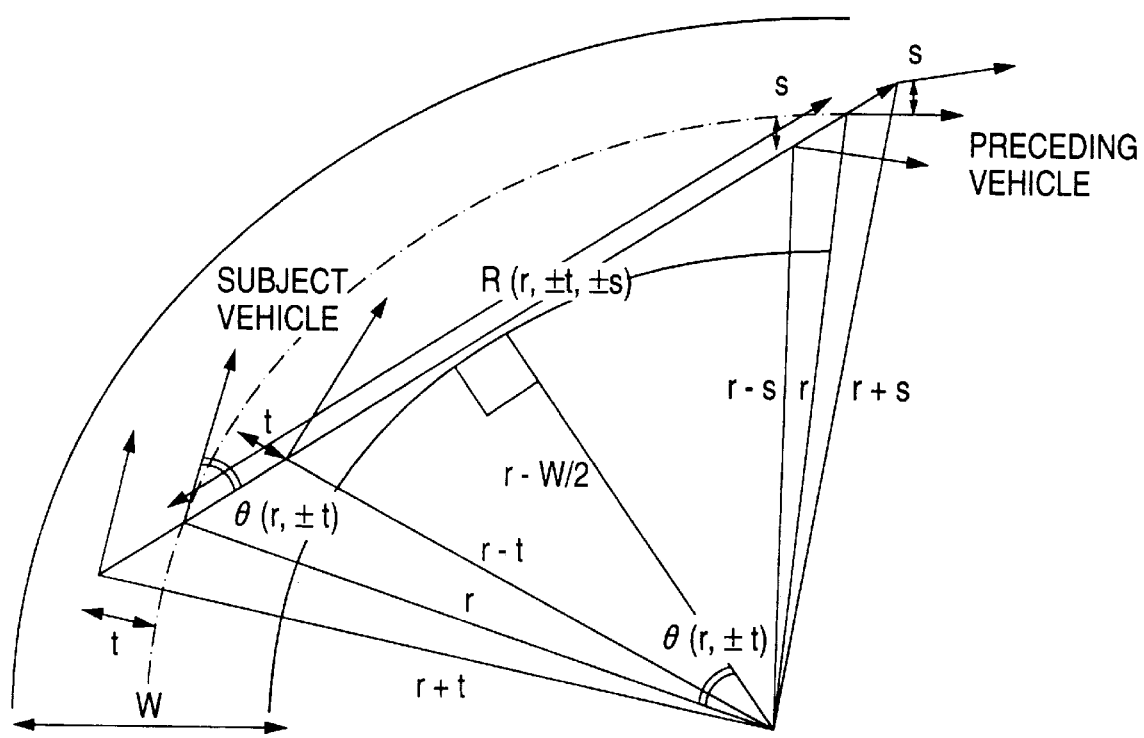
FIG. 9 is an explanatory diagram illustrating a method of computing the straight line-of-sight angle and the straight line-of-sight distance from a subject vehicle to a preceding vehicle traveling on a subject-vehicle lane on a monotonous curved road.

FIG. 5 is a schematic diagram of a basic four-quadrant monopulse-type antenna unit 11, and FIGS. 6A and 6B and FIGS. 7A and 7B are graphs illustrating the basic principle of operation.

In the drawings, the meanings of the respective symbols are as follows.

SUM=sum of amplitudes in four quadrants A, B, C, and D of received radio waves     (15)

DIF (AZ)=difference in the electric field in the horizontal direction of the received radio waves     (16)

DIF (EL)=difference in the electric field in the vertical direction of the received radio waves     (17)

On the basis of field strength characteristics of antenna patterns shown in FIGS. 6 and 7, the signals outputted from the monopulse-type antenna unit 11 and shown in Formulae (15) to (17) are subjected to normalization processing or the like of DIF (AZ) / SUM and DIF (EL) / SUM in advance by the arithmetic-operation control unit 10 to obtain the angle discrimination characteristic, and the values of Formulae (15) to (17) in actual received radio waves are applied to the angle discrimination characteristic, thereby to determine the angles in the horizontal direction and in the vertical direction.

Accordingly, even if a fixed beam is used without adopting a mechanical driving unit for controlling the scanning direction of transmitted radio waves and received radio waves, information on the angle of the object is multiplexed with the signal of received radio waves from the monopulse-type antenna unit 11, and the relative distance, the relative velocity, and the angle are computed by the arithmetic-operation control unit 10 on the basis of the data from the frequency analysis unit 9 such as the frequency, power, phase, and the like.

The vehicle-mounted radar apparatus in accordance with the present invention acquires data by transmitting radio waves or receiving radio waves in space by means of a fixed beam, and is provided with an antenna unit having such an antenna gain that a straight line-of-sight distance with respect to each straight line-of-sight angle from a subject vehicle to a preceding vehicle traveling on a subject-vehicle lane is set as a maximum detection distance. Accordingly, it becomes possible to detect the preceding vehicle traveling on the subject-vehicle lane from the subject vehicle on a straight road and a monotonous curved road, and it becomes possible not to detect objects such as vehicles which are present in a longer distance than is necessary. Hence, as for the frequencies of Fbu and Fbd generated during the section of a frequency rise and the section of a frequency drop in a frequency modulation period, frequencies of Fbu and Fbd which are transmitted from objects located at a longer distance than is necessary are relatively few, so that it becomes possible to find a correct combination of the frequencies of Fbu and Fbd from the same object among the objects located in a necessary distance, thereby making it possible to substantially mitigate the burden on signal processing.

According to the vehicle-mounted radar apparatus in accordance with the present invention, a monopulse-type antenna unit is used as said antenna unit. Therefore, even if a fixed beam is adopted without using a mechanical driving unit for controlling the scanning direction of transmitted radio waves and received radio waves, information on the angle of the object is multiplexed with the signal of received radio waves from the monopulse-type antenna unit, so that the angle can be computed by the arithmetic-operation control unit.

What is claimed is:

1. A vehicle-mounted radar apparatus for mounting on a subject vehicle comprising:

a fixed beam antenna unit for transmitting radio waves and receiving radio waves reflected by a vehicle, said antenna unit configured to have an antenna gain which is set so that a maximum detection distance for detecting objects using the vehicle-mounted radar apparatus is a straight line-of-sight distance with respect to each straight line-of-sight angle from said subject vehicle to a target vehicle traveling on a same path; and a signal processing unit for determining a relative distance and a relative velocity of said target vehicle based on reflected radio waves received by said antenna.

2. A vehicle-mounted radar apparatus according to claim 1, wherein said antenna unit comprises a monopulse antenna.

* * * * *